US009905815B2

(12) United States Patent
Okahata

(10) Patent No.: US 9,905,815 B2
(45) Date of Patent: Feb. 27, 2018

(54) INSERTION GUIDE DEVICE FOR FILM ARMORED BATTERY

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventor: Akira Okahata, Kanagawa (JP)

(73) Assignees: Nissan Motor Co., Ltd., Kanagawa (JP); Automotive Energy Supply Corporation, Kanagawa (JP)

( * ) Notice: Subject to any disclaimer, the term of this patent is extended or adjusted under 35 U.S.C. 154(b) by 0 days.

(21) Appl. No.: 14/909,649

(22) PCT Filed: Jun. 19, 2014

(86) PCT No.: PCT/JP2014/066231
§ 371 (c)(1),
(2) Date: Feb. 2, 2016

(87) PCT Pub. No.: WO2015/022811
PCT Pub. Date: Feb. 19, 2015

(65) Prior Publication Data
US 2016/0172636 A1 Jun. 16, 2016

(30) Foreign Application Priority Data

Aug. 14, 2013 (JP) .................................. 2013-168417

(51) Int. Cl.
*H01M 2/02* (2006.01)
*H01M 10/0525* (2010.01)
(Continued)

(52) U.S. Cl.
CPC ....... *H01M 2/0207* (2013.01); *H01M 2/0212* (2013.01); *H01M 2/1077* (2013.01);
(Continued)

(58) Field of Classification Search
CPC ........ H01M 2/02; H01M 2/0207; H01M 2/10; H01M 2/30; H01M 10/04; H01M 10/0525
See application file for complete search history.

(56) References Cited

FOREIGN PATENT DOCUMENTS

| JP | 2012003950 A | * | 1/2012 | ............ H01M 10/04 |
| JP | 2012-003950 A | | 5/2012 | |
| JP | 2012212606 A | | 11/2012 | |

* cited by examiner

*Primary Examiner* — Karie O'Neill Apicella
(74) *Attorney, Agent, or Firm* — Young Basile Hanlon & MacFarlane, P.C.

(57) ABSTRACT

When inserting film armored battery into space between movable plates, tab-shaped terminal projecting from side edge of outer packaging body is reliably guided into space. Guide member disposed at an upper position of movable plates is provided with guide surface portion tapered toward counter-insertion direction. In guide surface portion, relative to side edge of terminal on the side of insertion direction, a portion corresponding to terminal base portion close to outer packaging body is relatively projected toward counter-insertion direction in comparison with a portion corresponding to terminal tip portion far from outer packaging body. Terminal is thereby contacted to guide surface portion in a sliding manner from terminal base portion having a small deformation and is corrected to the shape before the deformation.

4 Claims, 9 Drawing Sheets

(51) Int. Cl.
*H01M 2/30* (2006.01)
*H01M 2/10* (2006.01)
*H01M 10/04* (2006.01)
*H01M 10/48* (2006.01)
(52) U.S. Cl.
CPC ........... *H01M 2/30* (2013.01); *H01M 10/482* (2013.01); *H01M 10/0481* (2013.01); *H01M 10/0525* (2013.01)

INSERTION GUIDE DEVICE FOR FILM ARMORED BATTERY

CROSS REFERENCE TO RELATED APPLICATION

The present application claims priority to Japanese Patent Application No. 2013-168417, filed on Aug. 14, 2013, incorporated herein in its entirety.

TECHNICAL FIELD

The present invention relates to an insertion guide device for a film armored battery.

BACKGROUND

For a flat film armored battery with a tab-shaped terminal guided out from a side edge of a rectangular outer packaging body, compression is performed by a compression device in a step such as a screening step for detecting a metallic foreign matter (contamination) as described in Japanese Patent Application Publication No. 2012-003950. In such a compression, a film armored battery is inserted into a predetermined space between a plurality of plates which are arranged in a predetermined plate stacking direction with the space interposed therebetween, and the plates are pressurized in the plate stacking direction to compress the film armored battery.

Since a tab-shaped terminal made of, for example, an electrically conductive metal foil is very thin and fragile, when inserting a film armored battery into a space between plates, more particularly, when inserting the battery with a posture laterally locating the terminal such that a side edge of an outer packaging body from which the terminal is guided out can be along the insertion direction, it is apprehended that the terminal may not be successfully inserted into the space, and may interfere with the plates to be bent, or may be inserted into another neighboring space between plates.

It may be thus considered that a guide member for guiding insertion of a terminal is provided at an upper position of plates through which the terminal passes during insertion. If the terminal is in such a situation as having been bent before insertion, however, there is apprehension that the terminal still may get caught on the guide member or may be inserted into another neighboring space.

SUMMARY

The present invention was made in view of the above circumstances. An object of the present invention is to provide a new insertion guide device for a film armored battery which device can suitably insert a tab-shaped terminal into a predetermined space between plates even if the terminal is in such a situation as being bent.

The present invention assumes that a flat film armored battery with a tab-shaped terminal guided out from a side edge of a rectangular outer packaging body is inserted into a space between a plurality of plates which are arranged in a predetermined plate stacking direction to be spaced at predetermined intervals, in a predetermined insertion direction perpendicular to the plate stacking direction. The film armored battery is inserted with a posture allowing the side edge of the outer packaging body from which the terminal is guided out to be along the insertion direction.

Then, in the present invention, a guide member for guiding the terminal to the space between the plates during the insertion of the film armored battery is provided. In the guide member, a portion corresponding to a base portion close to the outer packaging body in the terminal, that is, a portion contacted to a base portion of the terminal in a sliding manner, is relatively projected toward the counter-insertion direction in comparison with a portion contacted in a sliding manner to a tip portion far from the outer packaging body in the terminal, that is, a tip portion of the terminal.

Such a construction, when inserting a film armored battery, results in a configuration in which the base portion having a small amount of deformation in the terminal will be initially contacted to the guide member in a sliding manner, so that the deformation of the terminal will be gradually corrected and modified from the base portion by the guide member. Even if the tip portion of the terminal has a large amount of deformation, therefore, the terminal can be well guided to the appropriate space.

The guide member is more preferably provided with a guide surface portion tapered toward a counter-insertion direction which is a direction opposed to the insertion direction. Then, the shape of the guide surface portion is set to be of triangular cross-section tapered toward the counter-insertion direction. This allows the terminal to be reliably guided by an inclined surface of the guide surface portion to a predetermined space even if the terminal hits the neighborhood of an apex portion of the guide surface portion in the counter-insertion direction.

According to the present invention, when inserting a film armored battery into a space between plates, a terminal guided out from an outer packaging body can be reliably guided into the space.

DETAILED DESCRIPTION OF THE EMBODIMENTS

Figure 1:
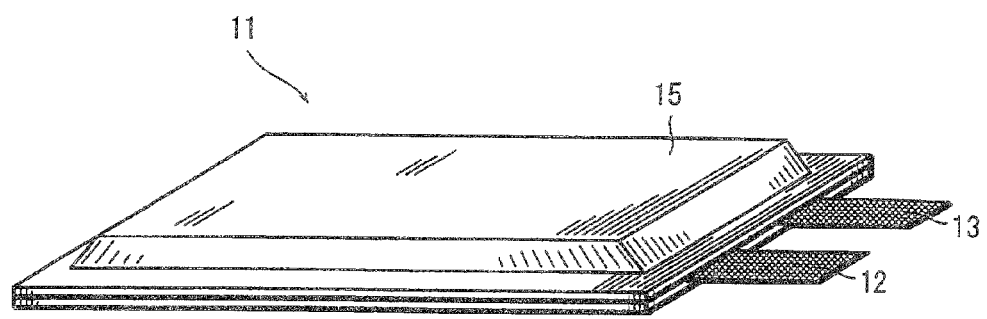
FIG. 1 is a perspective view showing a film armored battery according to one embodiment of the present invention.

Hereinafter, the present invention will be described by illustrated embodiments. First, film armored battery 11 will be described based on FIGS. 1 and 2. Film armored battery 11 is, for example, a lithium ion secondary battery, has an appearance of a shape of a flat rectangle and comprises a pair of tab-shaped terminals 12 and 13 made of an electrically conductive metal foil at one end edge in a longitudinal direction, as shown in FIG. 1.

Figure 2:
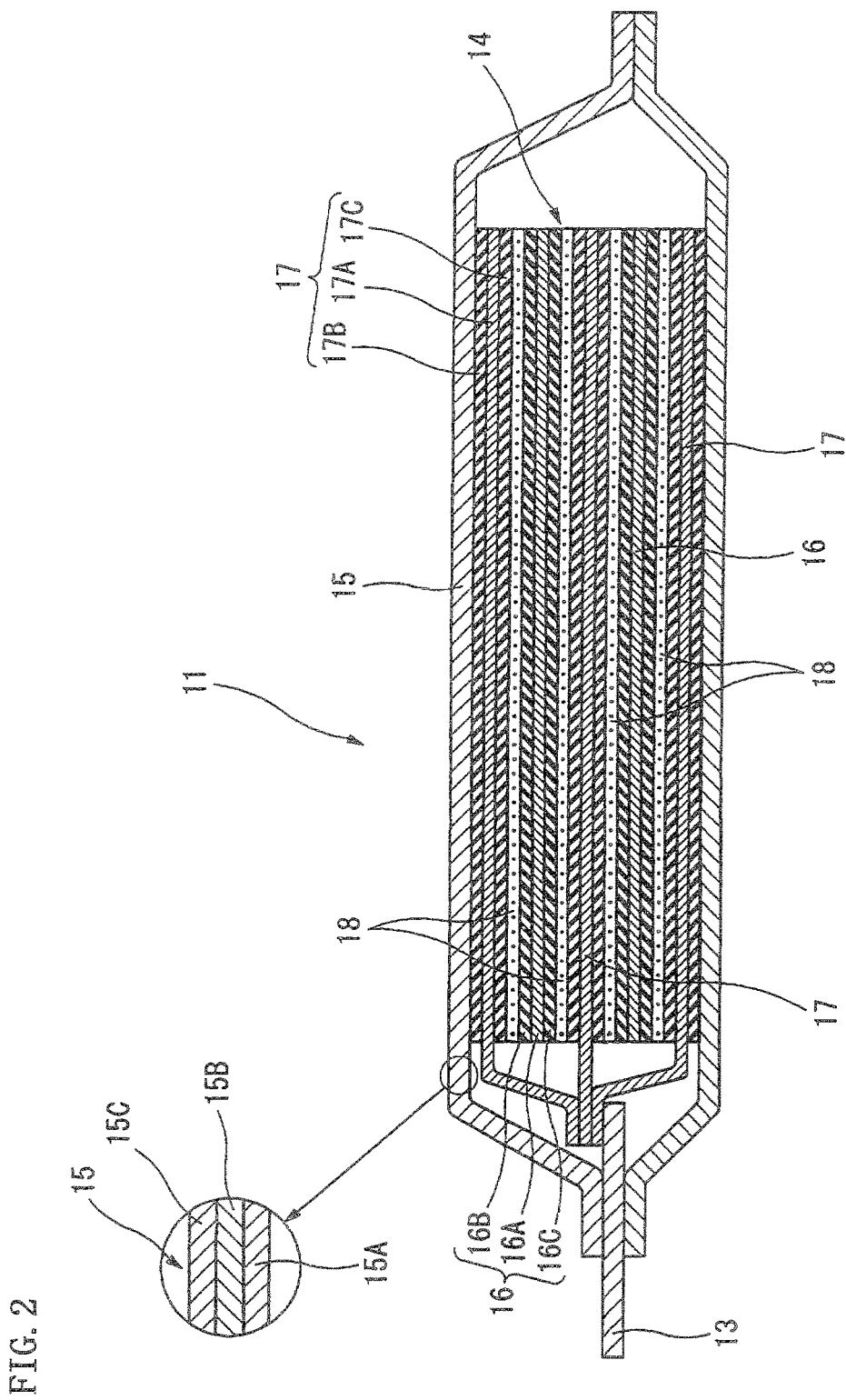
FIG. 2 is a sectional view also showing a film armored battery.

As shown in FIG. 2, film armored battery 11 contains rectangular power generating element 14 along with an electrolytic solution in outer packaging body 15 made of a laminate film. Power generating element 14 comprises a plurality of positive electrode plates 16 and negative electrode plates 17 stacked alternately via separators 18. It includes, for example, three (3) negative electrode plates 17, two (2) positive electrode plates 16, and four (4) separators 18 therebetween. That is, in this embodiment, negative electrodes 17 are located at both faces of power generating element 14. However, there may be a construction in which positive electrodes 16 are located at the outermost layers of power generating element 14. In addition, the dimensions of each part in FIG. 2 are not always accurate and are exaggerated for the purpose of explanation.

Positive electrode plate 16 comprises positive electrode active material layers 16B and 16C formed on both faces of rectangular positive electrode collector 16A. Positive electrode collector 16A is formed of, for example, an electrochemically stable metal foil such as aluminum foil, aluminum alloy foil, copper foil or nickel foil. Further, positive electrode active material layers 16B and 16C are formed by, for example, mixing a positive electrode active material such as lithium composite oxide, for example, lithium nickel oxide ($LiNiO_2$), lithium manganese oxide ($LiMnO_2$) or lithium cobalt oxide ($LiCoO_2$), a conductive agent such as carbon black, and a binder, applying the resulting mixture composition to the main surfaces of positive electrode collector 16A and subjecting the applied mixture composition to drying and rolling.

Negative electrode plate 17 comprises negative electrode active material layers 17B and 17C formed on both faces of rectangular negative electrode collector 17A. Negative electrode collector 17 is formed of, for example, an electrochemically stable metal foil such as nickel foil, copper foil, stainless steel foil or iron foil. Negative electrode active material layers 17B and 17C are formed by, for example, mixing a negative electrode active material capable of absorbing and desorbing lithium ions of the positive electrode active material, such as amorphous carbon material, hardly-graphitized carbon, easily-graphitized carbon or graphite, with a binder, applying the resulting mixture composition to the main surfaces of negative electrode collector 17A and subjecting the applied mixture composition to drying and rolling.

Portions of end edges in a longitudinal direction of negative electrode collector 17A extend as extending portions which do not have negative electrode active material layers 17B and 17C, and extremities of the extending portions are joined to negative electrode terminal 13. Similarly, portions of end edges in a longitudinal direction of positive electrode collector 16A extend as extending portions which do not have positive electrode active material layers 16B and 16C, and extremities of the extending portions are joined to positive electrode terminal 12, although not shown in FIG. 2.

Separators 18 function to prevent a short circuit between positive and negative electrode plates 16 and 17, and, at the same time, to retain the electrolyte material, and comprise, for example, a microporous film of polyolefin etc. such as polyethylene (PE) or polypropylene (PP) so as to close pores in the porous film by heat generation with the passage of overcurrent and thereby exhibit a current interrupt function. In addition, separator 18 is not limited to a single-layer film of polyolefin etc. It is also possible to use a three-layer structure in which a polypropylene film is sandwiched between polyethylene films or a laminated structure prepared by laminating a microporous polyolefin film, an organic nonwoven fabric, etc.

Further, there is no particular limitation on the electrolytic solution. For example, it is possible to use a non-aqueous electrolytic solution in which a lithium salt is dissolved in an organic solvent as an electrolytic material typically used in a lithium ion secondary battery.

Outer packaging body 15 which contains power generating element 14 having the above construction, along with an electrolytic solution, is made of a laminate film having a three-layer structure of heat-fusion bonding layer 15A, metal layer 15B and protective layer 15C, as partially shown in enlarged dimension in FIG. 2. Intermediate metal layer 15B is formed of, for example, aluminum foil, heat-fusion bonding layer 15A which covers an inside surface of metal layer 15B is formed of a synthetic resin capable of heat-fusion bonding such as polypropylene (PP), and protective layer 15C which covers an outside surface of metal layer 15B is formed of a synthetic resin excellent in durability such as polyethylene terephthalate (PET). In addition, a laminate film having a larger number of layers may be used. Further, although layers of synthetic resin are laminated on both surfaces of metal layer 15B in the above embodiment, the synthetic resin layer on the outside surface of metal layer 15B is not necessarily essential. There may be a construction in which a layer of synthetic resin is provided only on the inside surface of metal layer 15B.

In one embodiment, outer packaging body 15 assumes a two-layer structure of one laminate film located on the lower surface side of power generating element 14 in FIG. 2 and the other laminate film located on the upper surface side of power generating element 14, and has a construction in which respective four (4) peripheral sides of the two laminate films are superposed on each other and heat-bonded to each other. The illustrated embodiment shows outer packaging body 15 having such a two-layer structure. Further, in another embodiment, outer packaging body 15 is made of one relatively large laminate film and has a construction in which power generating element 14 is located inside of the laminate film being folded into two, and then the respective three (3) peripheral sides of the two are superposed on each other and heat-bonded to each other.

The pair of terminals 12 and 13 located on the side of a short side of rectangular film armored battery 11 is drawn through the bonding interface of the laminate film to extend outside of the laminate film when heat bonding the laminate film. Further, although the pair of terminals 12 and 13 is located side by side at the same one end edge in the illustrated embodiment, positive electrode terminal 12 may be located at one end edge and negative electrode terminal 13 may be located at the other end edge.

Manufacturing procedures of film armored battery 11 are as follows. First, positive electrode plates 16, negative electrode plates 16 and separators 18 are laminated in succession, and terminals 12 and 13 are attached by spot welding etc. to form power generating element 14. Then, power generating element 14 is covered with laminate films as outer packaging body 15 and four peripheral sides (three peripheral sides in the above two-fold) are heat-bonded to each other to leave a relatively small filling port. Then, an electrolytic solution is put into the interior of outer packaging body 15 through the filling port, and then the filling port is heat bonded to bring outer packaging body 15 into an enclosed state. Since film armored battery 11 is thus completed, film armored battery 11 is then charged to a required level and aged in this state for a predetermined length of time. After completion of the aging, film armored battery 11 is charged again for screening such as voltage inspection, and then shipped.

In addition, film armored battery 11 of this type is used as a battery module which contains a plurality of film armored batteries 11 in a flat box type casing. In this case, there is an arrangement in which the plurality of film armored batteries 11 are stacked in the casing of the module, and outer packaging body 15 may be in a state to be compressed to some extent in a plate stacking direction of power generating element 14 (in a direction perpendicular to the main surface of power generating element 14) by, for example, a portion of the casing or an elastic member which is separate from the casing.

In the screening step, a plurality of film armored batteries 11 are stored in compression device 20 (see FIG. 3), film armored batteries 11 are compressed as will be described hereinafter, and then whether or not a metallic foreign matter (contamination) exists in the interior of film armored batteries 11 is detected and diagnosed. The screening step is performed at an appropriate time after injecting an electrolytic solution and complete enclosing of outer packaging body 15 (sealing of a filling port) in the above manufacturing step. For example, the screening step may be provided immediately before shipping as film armored battery 11 or the screening step may be provided immediately after complete enclosing of outer packaging body 15. Further, since a foreign matter may be precipitated in the interior in the aging step, it is also effective to provide the screening step immediately after the aging step.

The reason why the screening step is performed will be described. When a metallic foreign matter creeps into the interior of film armored battery 11 in a battery manufacturing step, it is apprehended that the metallic foreign matter may break and pass through separator 18 to create a situation in which the positive electrode active material and the negative electrode active material are short-circuited, and in this case a desired voltage cannot be generated. Thus, a screening step is required to detect (diagnose) whether or not a metallic foreign matter creeps into the interior of film armored battery 11. What should be done to see whether or not the positive electrode active material and the negative electrode active material are short-circuited by a metallic foreign matter is to monitor voltage across a pair of terminals 12 and 13. That is, if the degree of decrease in a voltage generated by film armored battery 11 is not considerably changed from an expected degree of decrease in voltage even when a predetermined length of time passes after cease of charging, a metallic foreign matter can be diagnosed as not being mixed. On the contrary, if the degree of decrease in voltage when a predetermined length of time passes after cease of charging is considerably changed beyond an expected degree of decrease in voltage, a metallic foreign matter can be diagnosed as being mixed.

Further, in the screening step, film armored battery 11 is compressed in a plate stacking direction by compression device 20 as will be described hereinafter, and inspection is performed with film armored battery 11 remaining in the compressed state such that a metallic foreign matter can be reliably detected, that is, a metallic foreign matter passes through separator 18.

Figure 3:
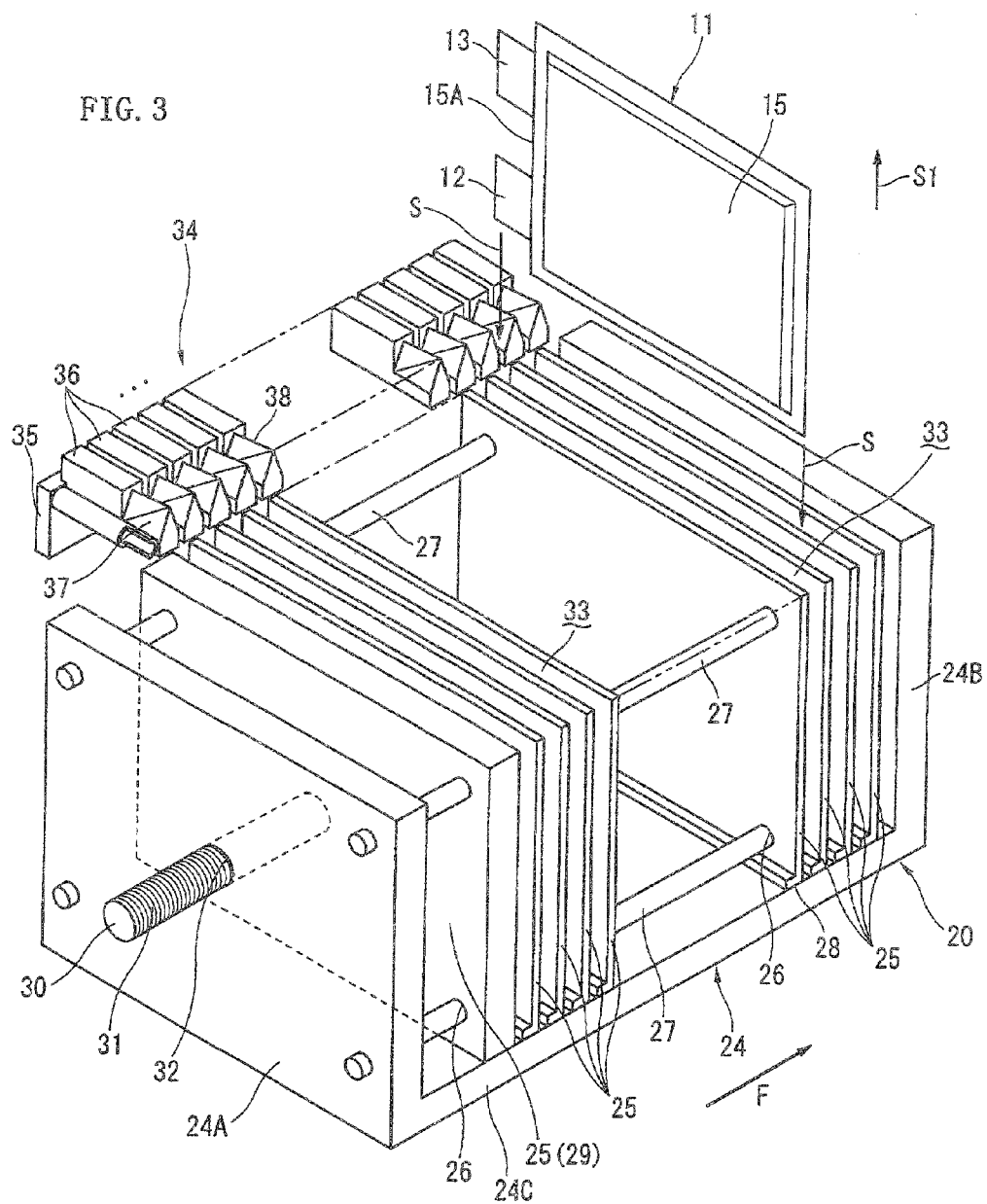
FIG. 3 is a perspective view showing a compression device to which an insertion guide device according to the present embodiment has been applied.
Figure 4:
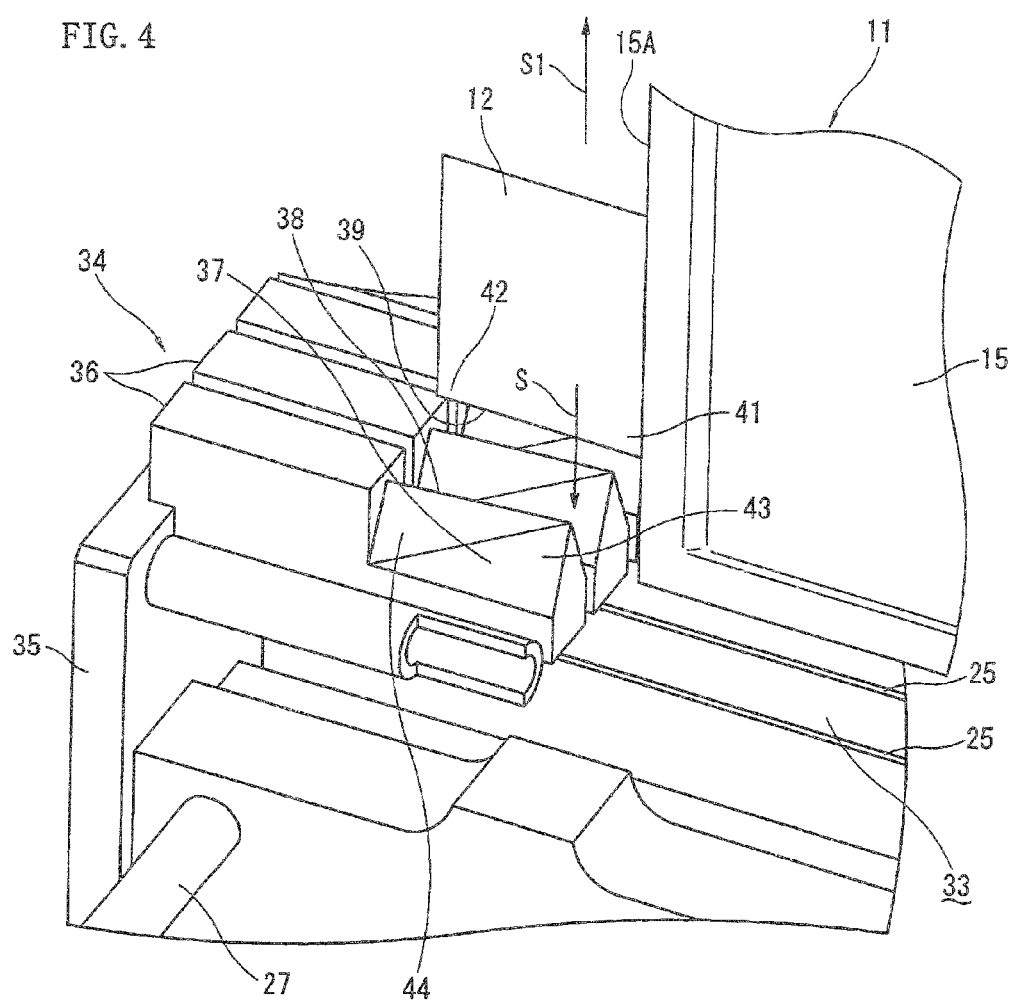
FIG. 4 is an enlarged perspective view showing a main part of FIG. 5.
Figure 5:
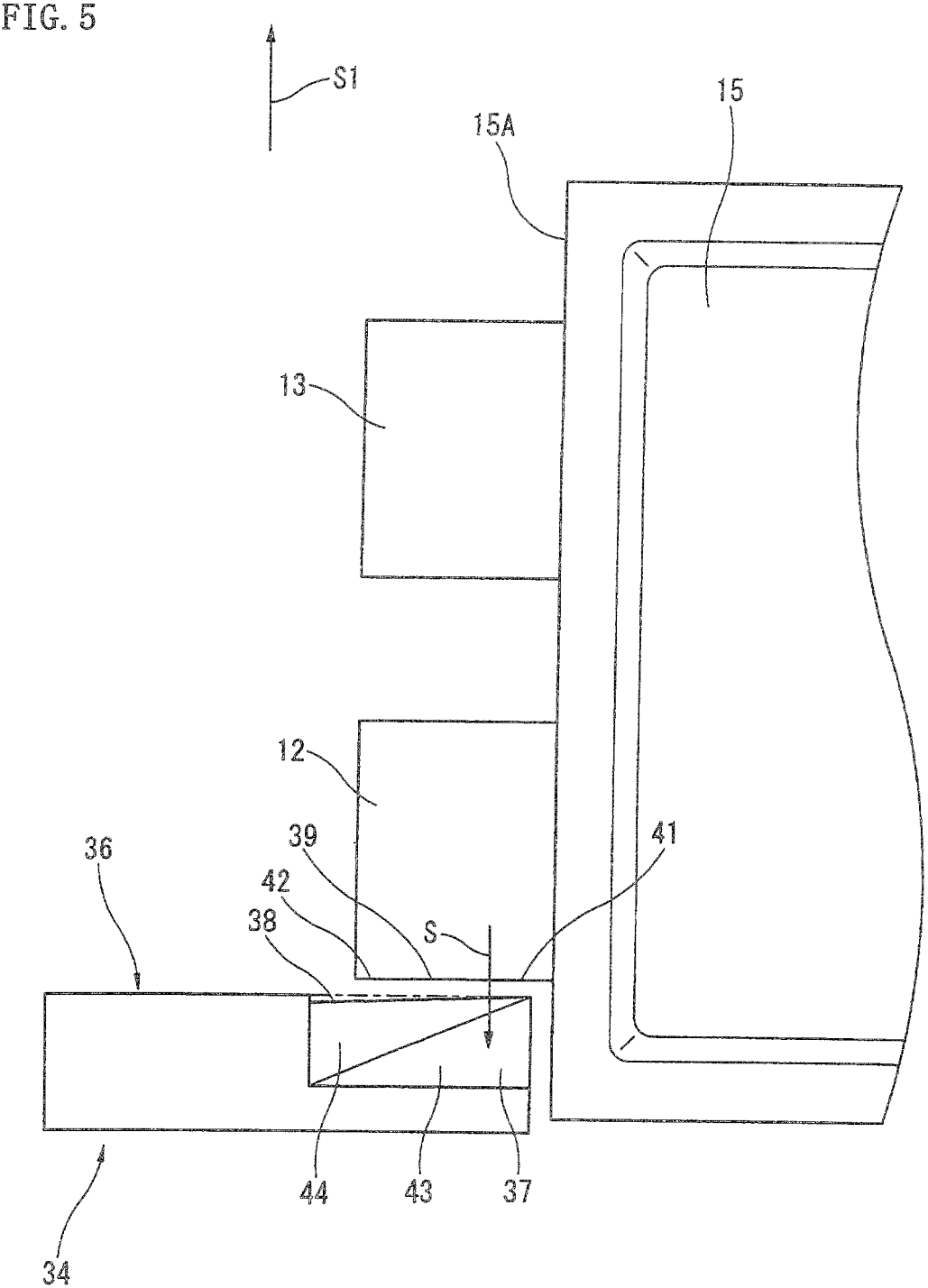
FIG. 5 is a side view showing the film armored battery and a guide member.
Figure 6:
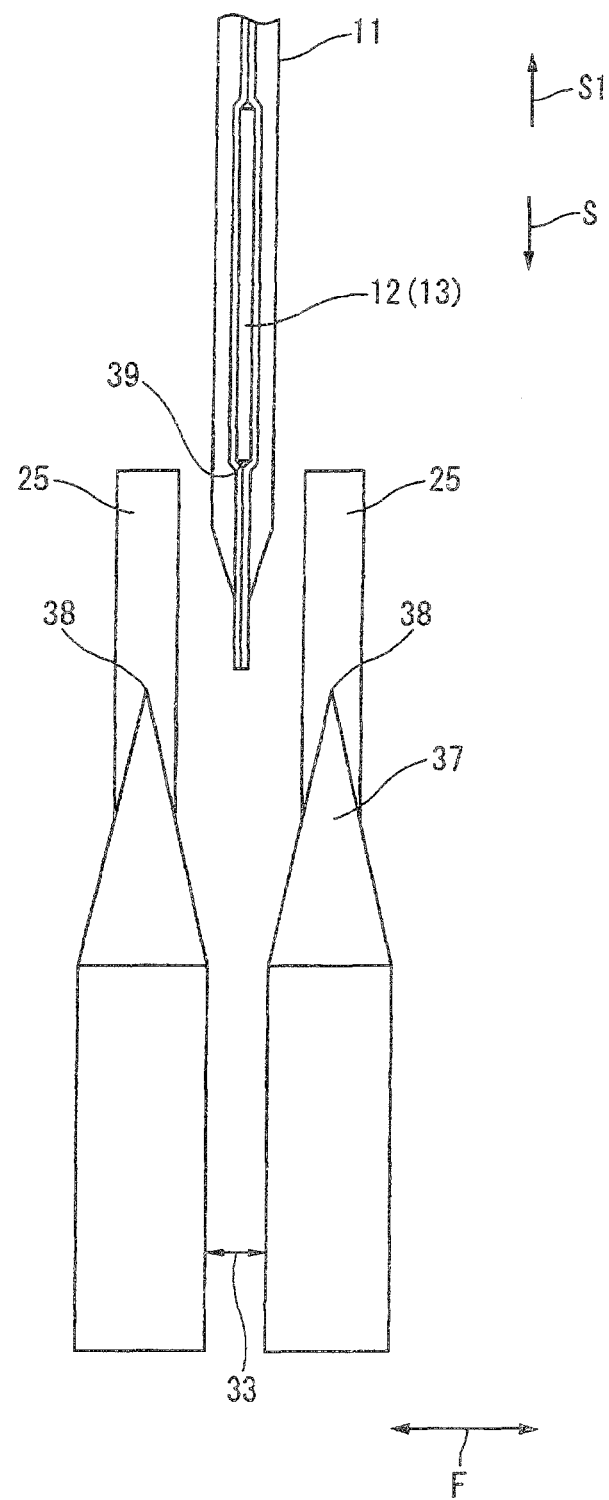
FIG. 6 is a top view showing a positional relation between the film armored battery and a guide surface portion.

FIGS. 3 to 5 show compression device 20 for film armored battery 11 to which an insertion guide device of the present embodiment is applied. In addition, the number of movable plates 25 or film armored batteries 11 is not limited to that shown in FIG. 3, etc. Compression device 11 has a lidless box type housing 24 and a plurality of rectangular plate-shaped movable plates (plates) 25. Housing 24 has fore wall 24A, aft wall 24B and bottom wall 24C connecting both fore wall 24A and aft wall 24B. In housing 24, the plurality of movable plates 25 are arranged in such a state that movable plates 25 can move in predetermined plate stacking direction F. Movable plates 25 are of the same shape. Movable plates 25 are for applying a surface pressure on the portion of power generating elements 14 of film armored batteries 11 from both sides in plate stacking direction F.

Each of movable plate 25 is provided with a slide mechanism capable of sliding in plate stacking direction F such that movable plate 25 does not trail along bottom wall 24C of housing 24. The slide mechanism has guide holes 26 provided at four (4) corners of movable plate 25 and rod-shaped guide rods 27 which pass loosely through guide holes 26. That is, guide holes 26 are provided at four corners of each movable plate 25 to allow each of stick-shaped guide rods 27 to pass through each of guide holes 26. After allowing stick-shaped guide rods 27 to pass through all of movable plates 25, both ends of stick-shaped guide rods 27 are secured to fore wall 24A and aft wall 24B, respectively, such that all movable plates 25 are capable of sliding in plate stacking direction F.

In addition, as also shown in FIG. 3, each of movable plates 25 is provided with bottom wall portion 28 which is bent in a section of L-shape to support the lower end of film armored battery 11.

Movable plate 25 which is positioned in a leftmost end in FIG. 3 is thick plate 29 for compression which is of slightly larger sectional area and thickness than all other movable plates 25. One end of clamping rod 30 externally formed with external threads 31 is secured to thick plate 29. Threaded bore 32 internally formed with internal threads having a threaded engagement with external threads 31 at the outer periphery of clamping rod 30 passes through and is defined in fore wall 24A of housing 24. Thus, by rotating the other end (the left end in FIG. 3) of clamping rod 30 by a nut runner (not shown) in a clockwise direction or a counterclockwise direction, clamping rod 30 can move via the thread engaging portion in plate stacking direction F, relative to fore wall 24A of housing 24 to allow thick plate 29 to move in plate stacking direction F. Further, thick plate 29 moves only linearly in plate stacking direction F, without transfer of the rotation of clamping rod 30. Compression force (fastening torque) and compression time by nut runner 23 are managed and controlled by a control portion (not shown).

Then, by locating each of film armored batteries 11 in a space between two (2) adjacent movable plates 25 and compressing the whole of film armored batteries 11 from both sides in plate stacking direction F, each film armored battery 11 is compressed in plate stacking direction F. In this case, each film armored battery 11 is such that a surface pressure applied on the portion of power generating element 14 thereof from both sides in right and left direction is kept in a state as uniform as possible.

As shown in FIGS. 3 and 4, film armored battery 11 is inserted into space 33 between adjacent movable plates 25 with a posture allowing side edge 15A of outer packaging body 15 from which terminals 12 and 13 are guided out to be along insertion direction S (downward direction in FIG. 3) of film armored battery 11 perpendicular to plate stacking direction F. In this case, the plurality of movable plates 25 are kept in such a state that movable plates 25 are arranged to be spaced equidistantly at regular intervals in plate stacking direction F, with a jig (not shown). In addition, film armored batteries 11 before insertion are also kept in such a state that film armored batteries 11 are arranged to be spaced equidistantly at regular intervals in plate stacking direction F, with a jig (not shown), that is, each of film armored battery 11 is arranged to be along insertion direction S, above space 33 between movable plates 25. Thus, film armored battery 11 is inserted into corresponding space 33 by moving film armored battery 11 along insertion direction S to the side of movable plate 25.

Then, in the present embodiment, guide member 34 as an insertion guide device for guiding insertion of tab-shaped terminals 12 and 13 when inserting film armored battery is provided. Guide member 34 is disposed at an upper position of movable plate 25 through which terminals 12 and 13 pass when inserting film armored battery 11, and a plurality of block-shaped guide blocks 36 are secured to attachment plate 35 extending in plate stacking direction F. The plurality of guide blocks 36 are arranged to be spaced equidistantly at regular intervals in plate stacking direction in a manner similar to movable plates 25.

As also shown in FIG. 4, each of guide blocks 36 is provided with guide surface portion 37 tapered toward counter-insertion direction S1 which is a direction opposed to insertion direction S. Guide surface portion 37 assumes a triangular cross-section tapered toward apex portion 38 assuming a ridgeline on the side of counter-insertion direction S1, and is located such that each apex portion 38 is positioned at a center of space 33 between movable plates 25 with respect to plate stacking direction F.

In guide surface portion 37 including apex portion 38 thereof, relative to side edge 39 on the side of insertion direction S of terminals 12 and 13 to be contacted to guide surface portion 37 in a sliding manner, a portion corresponding to base portion 41 close to outer packaging body 15 in terminals 12 and 13, that is, a portion capable of being contacted to base portion 41 of terminals 12 and 13 in a sliding manner, is relatively projected toward counter-insertion direction S1, in comparison with a portion corresponding to tip portion 42 far from outer packaging body 15 in terminals 12 and 13, that is, a portion capable of being contacted to tip portion 42 in a sliding manner.

More concretely, as shown in FIG. 5, apex portion 38 takes a tapered shape relatively inclined toward counter-insertion direction S1 (upward direction in FIG. 5) as apex portion 38 proceeds from the tip side to the base side of the terminals (that is, as it approaches outer packaging body 15), relative to side edge 39 on the side of insertion direction S of terminals 12 and 13.

As will be described in more detail, in this embodiment, guide surface portion 37 has a construction formed by bending such that, into the side of counter-insertion direction S1 of first inclined surface portion 43 having a relatively small interior angle between two (2) inclined surfaces, second inclined surface portion 44 having a relatively large interior angle between two (2) inclined surfaces merges. Guide surface portion 37 assumes such a shape that the formed area of second inclined surface portion 44 gradually becomes larger as guide surface portion 37 proceeds from the base side to the tip side of terminals 12 and 13. Thus, guide surface portion 37 in apex portion 38 as well as in the portion of the inclined surface is projected toward counter-insertion direction S1 as guide surface portion 37 proceeds from the tip to the base side of the terminals.

Figure 7:
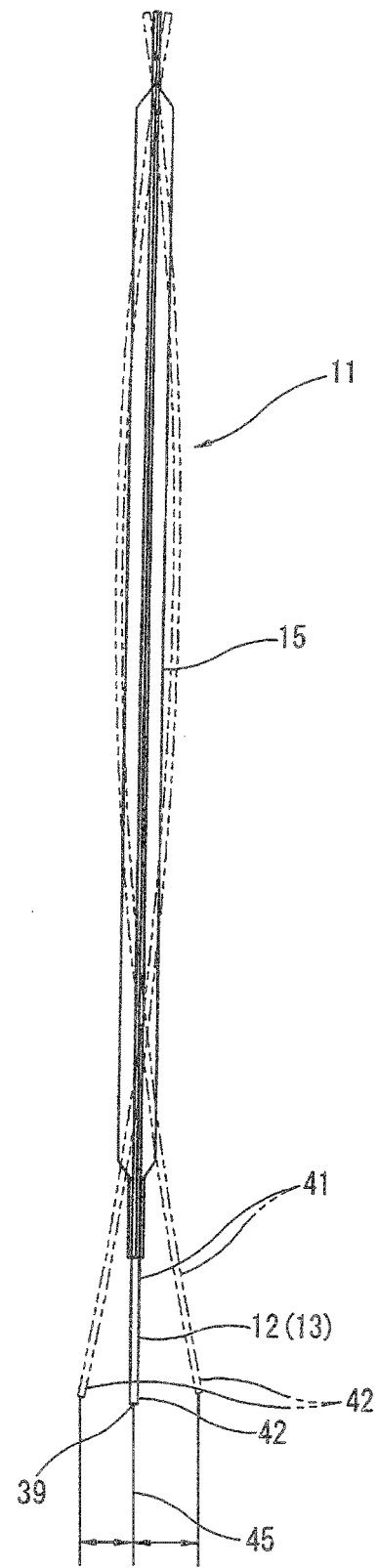
FIG. 7 is an explanatory view showing a modified embodiment of the film armored battery.

Next, the effect of the present embodiments will be described. As shown in FIG. 7, terminal 12 (13) has a larger deformation such as warpage, that is, a larger amount of deformation (amount of warpage) relative to reference plane 45 at a center of a main surface of film armored battery 11, in tip portion 42 than base portion 41 connected to the side of relatively thick outer packaging body 15. In the present embodiments, as shown in FIG. 4 or 5, thus, in guide surface portion 37, a portion corresponding to base portion 41 is projected toward the side of counter-insertion direction S1 in comparison with a portion corresponding to tip portion 42. As a result of this, when inserting film armored battery 11, base portion 41 having a small amount of deformation in terminals 12 and 13 will be initially contacted to guide surface portion 37 in a sliding manner, so that the deformation of terminals 12 and 13 will be gradually corrected and modified from base portion 41 by guide surface portion 37. Therefore, even if tip portion 42 has a large amount of deformation, terminals 12 and 13 are well guided to appropriate space 33.

In addition, since the shape of guide surface portion 37 is set to be of triangular cross-section, terminals 12 and 13 are reliably guided by an inclined surface of guide surface portion 37 to predetermined space 33 even if terminals 12 and 13 hit the neighborhood of apex portion 38 of guide surface portion 37.

Even if an inclination angle of apex portion 38 of guide surface portion 37 relative to side edge 39 of the terminal has a slight angle, for example, an angle of 0.2 degrees or more, the effect can be obtained. Similarly, even if the height difference in apex portion 38 of guide surface portion 37 has a small dimension, for example, a dimension of 0.2 mm or more, the desired effect can be obtained.

Figure 8:
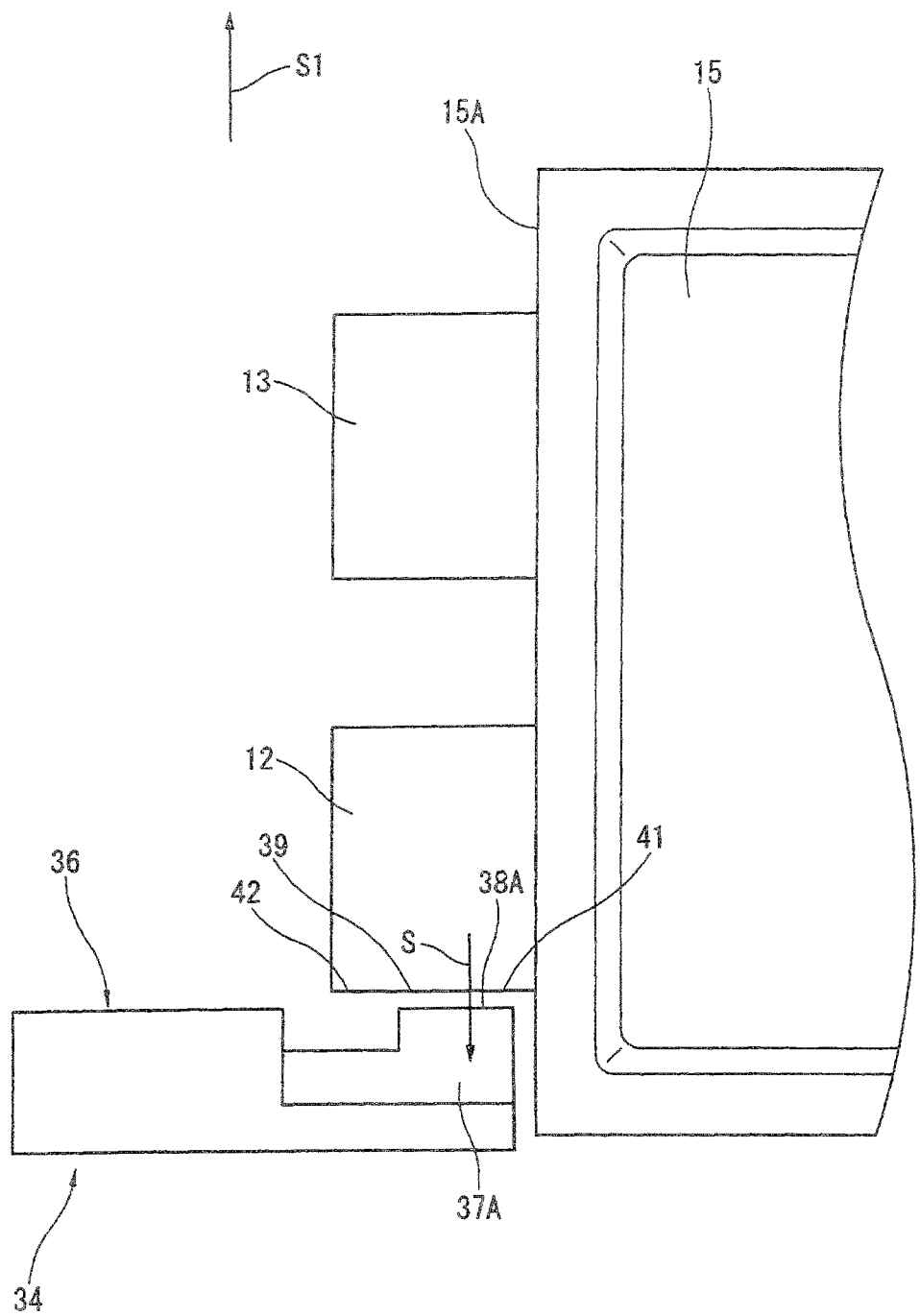
FIG. 8 is an explanatory view showing another embodiment of a shape of a guide surface portion.

While the present invention has been described based on the concrete embodiments as described above, the present invention is not limited to the embodiments but is susceptible of various changes and modifications. While, for example, in guide surface portion 37 of the embodiment, the portion on the base side is projected beyond the portion on the tip side toward counter-insertion direction S1 by allowing apex portion 38 to take an inclined tapered shape, apex portion 38A may be formed in a stepped-shape such that the height of guide surface portion 37A changes in a stepwise fashion, for example, as in another embodiment shown in FIG. 8. Even in such a case, the portion of guide surface portion 37 on the base side is projected beyond the portion on the tip side so that an effect similar to that in the embodiment can be obtained.

Figure 9:
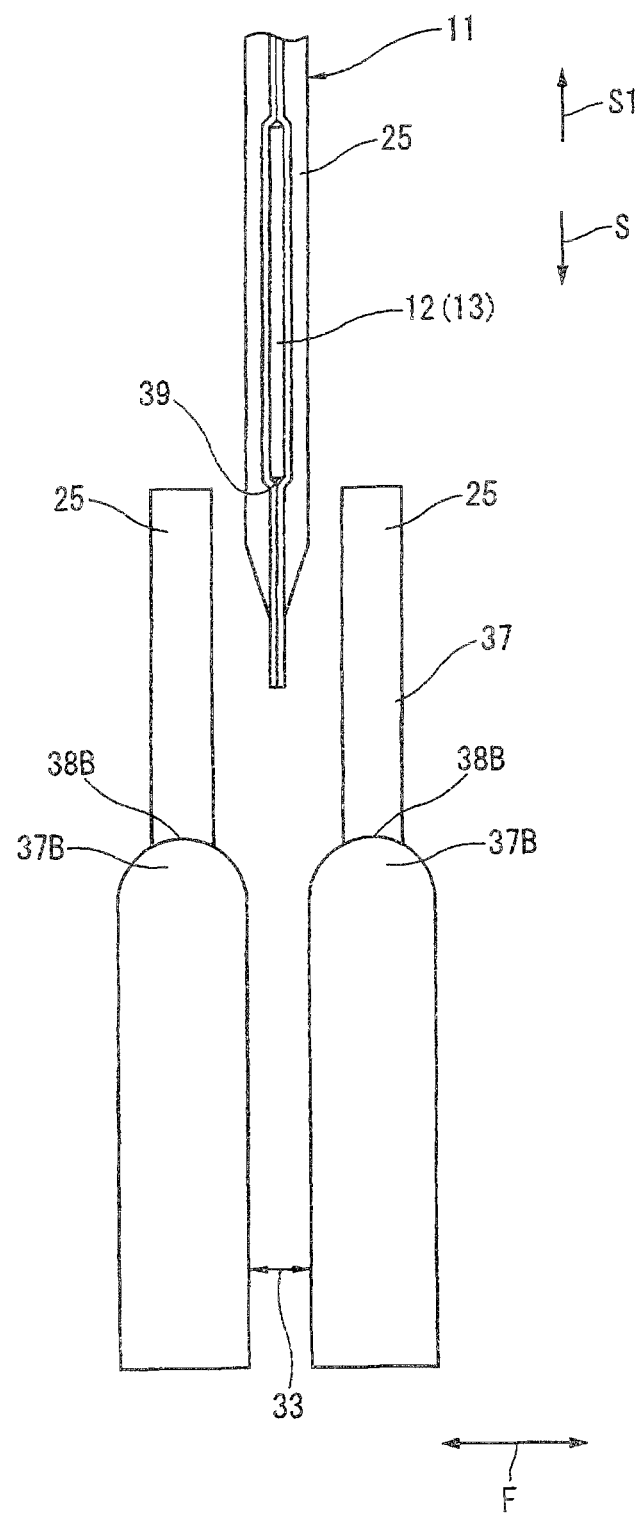
FIG. 9 is a top view also showing another embodiment of a shape of a guide surface portion.

Further, while the shape of guide surface portion 37 is set to be of triangular cross-section in the embodiment, the shape of guide surface portion 37 is not limited to such a shape but may be any shape that is tapered toward counter-insertion direction S1, for example, guide surface portion 37B may have the shape of a semicircular cross-section as shown in FIG. 9. When guide surface portion 37B has the shape of a semicircular cross-section as just described, however, inclination around the neighborhood of apex portion 38B becomes relatively gentle so that terminals 12 and 13 can enter neighboring spaces other than appropriate space 33 when terminals 12 and 13 hit the neighborhood of apex portion 38B. Therefore, it is most preferable that guide surface portion 37 have the shape of a triangular cross-section like the embodiment.

The invention claimed is:

1. An insertion guide device for a film armored battery, that inserts a flat film armored battery with a tab-shaped terminal guided out from a side edge of a rectangular outer packaging body into a space between a plurality of plates which are arranged in a predetermined plate stacking direction to be spaced at predetermined intervals, in a predetermined insertion direction perpendicular to the plate stacking direction, wherein the film armored battery is inserted with a posture allowing the side edge of the outer packaging body from which the terminal is guided out to be along the insertion direction, and wherein a guide member for guiding the terminal to the space between the plates during insertion of the film armored battery is provided, wherein the terminal has a base portion close to the outer packaging body and a tip portion that is farther from the outer packaging body than the base portion in a transverse direction that is perpendicular to the plate stacking direction and the insertion direction, wherein the guide member has first and second portions in the transverse direction that respectively correspond to the base portion and the tip portion of the terminal, and wherein the first portion of the guide member is relatively projected toward a counter-insertion direction that is opposite to the insertion direction in comparison with the second portion of the guide member.

2. The insertion guide device for a film armored battery of claim 1, wherein the guide member has a guide surface portion tapered toward the counter-insertion direction which is a direction opposed to the insertion direction.

3. The insertion guide device for a film armored battery of claim 2, wherein an apex portion of the guide surface portion is inclined such that the first portion corresponding to the base portion of the terminal is projected toward the counter-insertion direction relative to a side edge on a side of the insertion of the terminal.

4. The insertion guide device for a film armored battery of claim 3, wherein the guide surface portion has a shape of triangular cross-section tapered toward the apex portion.

* * * * *